United States Patent
Readio et al.

(10) Patent No.: US 6,819,060 B2
(45) Date of Patent: Nov. 16, 2004

(54) POWER LINE MONITOR AND INTERRUPT ARRANGEMENT FOR AVERTING PREMATURE LAMP MORTALITY IN LOW VOLTAGE CONDITIONS

(75) Inventors: Philip O. Readio, Savage, MN (US); Tracy L. Lentz, Minnetonka, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/304,548

(22) Filed: Nov. 26, 2002

(65) Prior Publication Data

US 2004/0100208 A1 May 27, 2004

(51) Int. Cl.[7] .............................................. H05B 37/02
(52) U.S. Cl. ...................................... 315/291; 315/313
(58) Field of Search ................................ 315/291, 295, 315/297, 302, 307, 313; 250/504 R; H05B 37/02

(56) References Cited

U.S. PATENT DOCUMENTS

| | | | |
|---|---|---|---|
| 4,914,742 A | | 4/1990 | Higashi et al. |
| 4,981,035 A | | 1/1991 | Hall |
| 5,107,687 A | | 4/1992 | Candeloro |
| 5,200,156 A | | 4/1993 | Wedekamp |
| 5,225,167 A | | 7/1993 | Wetzel |
| 5,491,387 A | * | 2/1996 | Saito .......................... 315/307 |
| 5,601,619 A | | 2/1997 | Drechsler |
| 5,601,786 A | * | 2/1997 | Monagan ..................... 422/108 |
| 5,635,133 A | | 6/1997 | Glazman |
| 5,663,613 A | * | 9/1997 | Yamashita et al. .......... 315/308 |
| 5,688,308 A | | 11/1997 | Voights |
| 5,708,205 A | | 1/1998 | Yamada et al. |
| 5,742,063 A | * | 4/1998 | Scroggins et al. ...... 250/455.11 |
| 5,755,103 A | | 5/1998 | Na et al. |
| 5,935,525 A | | 8/1999 | Lincoln et al. |
| 5,968,455 A | | 10/1999 | Brickley |
| 6,022,511 A | | 2/2000 | Matschke |
| 6,063,170 A | | 5/2000 | Deibert |
| 6,245,131 B1 | | 6/2001 | Rippelmeyer et al. |
| 6,264,802 B1 | | 7/2001 | Kamrukov et al. |
| 6,280,686 B1 | | 8/2001 | Scheir et al. |
| 6,438,971 B1 | | 8/2002 | Lentz et al. |
| 6,570,369 B2 | * | 5/2003 | Tamai et al. ................. 323/288 |
| 2003/0111969 A1 | * | 6/2003 | Konishi et al. .............. 315/291 |

OTHER PUBLICATIONS

Honeywell Brochure, "Comfort, Energy & Health Solutions," 2 pgs, © Honeywell 2001.
Owner's Guide, "Enviracaire Elite—UV100E Ultraviolet Air Treatment Systems," 8 pgs. © Honeywell 2001.

* cited by examiner

*Primary Examiner*—Don Wong
*Assistant Examiner*—Trinh Vo Dinh

(57) ABSTRACT

A system and method for mitigating the effects of low power line voltage that can otherwise cause premature lamp mortality. A monitor circuit is provided for monitoring power characteristics relating to UV and/or fluorescent lamp operation, such as the lamp supply voltage or the current traversing the lamp. A controller operates in conjunction with the monitor circuit. The controller receives a signal indicative of the state of the monitored power characteristics, and temporarily interrupts the power to the lamp when the signal indicates that the power source is currently failing to maintain a stable current flow through the lamp. Power is therefore removed from the lamp during periods of brownout or other low voltage conditions to prevent accelerated lamp mortality.

42 Claims, 7 Drawing Sheets

POWER LINE MONITOR AND INTERRUPT ARRANGEMENT FOR AVERTING PREMATURE LAMP MORTALITY IN LOW VOLTAGE CONDITIONS

FIELD OF THE INVENTION

This invention relates in general to lamp control, and more particularly to a system and method for controlling lamp operation, such as ultraviolet (UV) and fluorescent lamp operation, in brownout and other substandard source voltage conditions.

BACKGROUND OF THE INVENTION

Increased consumer power, deregulation laws, and other factors have imposed additional physical and economic stresses on utility organizations, thereby threatening record occurrences of power line phase droop and interruption events characteristic of poor transmission line regulation. In some cases, it is estimated that power line transmission losses will triple for utility companies.

Low line voltage or "sag" can have a significant impact on electrical equipment and products. For example, power supplies in some electronic equipment may fall out of regulation, motors can overheat or slow down, electrical interference may increase, etc. One product category that is significantly impacted by poor power line regulation includes ultraviolet/fluorescent lamps, that can flicker extensively under brownout conditions. In addition to the potentially undesirable visual effects, this flickering can damage the filaments of the lamp and cause premature lamp mortality. Lamps that would otherwise likely meet expected warranty periods or other commercial expectations can thus fail due to brownout conditions that are beyond the control of lamp manufacturers, product developers, and consumers.

Premature lamp mortality occurs in brownout or other low line voltage conditions as a result of the physics underlying ultraviolet (UV) lamp technology. In UV and fluorescent lamps, a sealed glass tube generally includes a small amount of mercury and an inert gas. The tube generally includes two electrodes or "filaments," one at each end of the tube, which are wired to an electrical circuit coupled to an alternating current (AC) power source. When the lamp is initially turned on, electricity heats up the filaments, which boils off electrons from the metal surface into the gas tube, which in turn ionizes the gas and creates an electrically conductive medium. At this point, the lamp's ballast provides the voltage kick across the filaments to establish an electrical arc through the gas. The resulting collision of free electrons with atoms releases other electrons, which creates ions, and ultimately plasma which establishes a path for an electrical current. Electrons migrating through the tube provide energy that causes some of the mercury to change to a gaseous state, which collides with the electrons and charged atoms. These collisions excite the atoms and bumps the electrons to higher energy levels, and when the electrons return to their original level, light photons are released.

When AC power is diminished due to brownout or other low voltage conditions, enough voltage may still be provided to create the arc through the gas, but not enough voltage to sustain the arc and resulting current through the lamp. In such a case, arcing occurs repeatedly, which causes the flickering effect. When the lamp flickers in this manner, the filaments are continually called upon to boil off electrons from its metal surface to ionize the gas and establish the arc. This degenerates the integrity of the filament, and ultimately causes lamp failure. More particularly, when the lamp is subject to low line conditions, the operating lamp's cathode glowing layers cover only part of the cathode. When this occurs, the glow moves around, causing the flickering effect. If the available current is enough to cause the cathode to be covered with glow, the voltage drop of the cathode will be higher than what is expected under normal operation, causing ions to bombard the cathode with increased force and accelerating the sputtering of cathode material atoms. This sputtering effect essentially "evaporates" the cathode material, causing uneven discharge, and leaving the filament thinner in some areas. The weakened area of the filament becomes hotter, which leads to even faster evaporation, thereby causing the filament to burn back and the lamp to burn out. Some lamps may burn out the instant they are turned on, because a thinned filament in a cold state cannot withstand the inrush surge of energy.

UV lamps are commonly used in the context of fluorescent lighting, where the inside surface of the UV lamp is coated with a phosphor that gives off a white light when exposed to UV light. However, UV lamps are used in a wide variety of other contexts. For example, UV lamps can be used to kill airborne bacteria and surface mold in air treatment systems. One such UV air treatment system is available under the trade name "Enviracaire Elite™," provided by Honeywell Inc., Golden Valley, Minn., U.S.A. The lamp life of UV lamps used in these and other UV lamp applications can be significantly diminished as a result of brownouts and other low line voltage conditions.

Accordingly, there is a need for a system and method for increasing lamp life that otherwise could be degraded due to poor power line regulation. The present invention fulfills these and other needs, and offers other advantages over the prior art.

SUMMARY OF THE INVENTION

In accordance with one embodiment of the invention, a control system is provided for controlling operation of at least one lamp powered by a power source. The control system includes a monitor circuit to monitor at least one power characteristic of the power source, and to provide a signal indicative of the monitored power characteristic in response. A controller is coupled to the monitor circuit to receive the signal, and to interrupt power supplied by the power source to the lamp, when the signal indicates that a voltage of the power source is less than a voltage threshold.

In more particular embodiments of such a control system, the power characteristic being monitored may be the current through the lamp, which may become erratic under low voltage conditions. In this case, the monitor circuit includes a current monitor to monitor the current through the lamp, and to provide a signal indicative of the state of current flow through the lamp. The controller is coupled to the current monitor to receive this signal, and to interrupt power supplied by the power source to the lamp when the signal indicates an erratic state of current flow through the lamp as a result of the voltage being less than the voltage threshold.

In other particular embodiments of such a control system, the power characteristic being monitored may be the voltage itself provided by the power source. In this case, the monitor circuit includes a voltage monitor to monitor the voltage provided by the power source, and to provide a signal indicative of the voltage provided by the power source. The controller is coupled to the voltage monitor to receive this signal, and to interrupt power supplied by the power source when the signal indicates that the voltage is less than the voltage threshold. Any aspect of the voltage may be monitored, such as peak voltage, RMS voltage, etc.

In other particular embodiments of such a control system, a controllable switch is provided between the power source and the lamp. This controllable switch may be provided at any location between the power source and the lamp within the circuit path, such as on either the supply or return side of the lamp. Further, the controllable switch may be a discrete switch(s), or may be a switch associated with another component such as a ballast that includes an input(s) to control the ballast switch. In one embodiment of the invention, the controller interrupts power supplied by the power source to the lamp by automatically opening the controllable switch in response to the signal indicating that the voltage of the power source is less than the voltage threshold.

In still other particular embodiments of such a control system, the controller is further configured to restore power supplied by the power source to the lamp in response to at least one predetermined event. The predetermined event(s) may include, for example, an expiration of a predetermined time duration, an expiration of a predetermined count value, a time of day, a signal indicating acceptable source voltage levels, etc.

In accordance with another embodiment of the invention, an ultraviolet (UV) air treatment system for treating air provided by an air handling system is provided. The air handling system includes, for example, an air duct arrangement for channeling the air through a targeted space. The air treatment system includes at least one UV lamp positionable within the air duct arrangement. A controllable switch is coupled between a power source and the UV lamp to enable power to the UV lamp when the controllable switch is closed (i.e., allows current to flow), and to disable power to the UV lamp when the controllable switch is open (i.e., disables current flow). A monitor circuit monitors at least one power characteristic of the power source when the controllable switch is closed, and provides a signal indicative of the power characteristics in response. A controller is coupled to the monitor circuit to receive the signal, and to open the controllable switch when the signal indicates that a voltage of the power source is less than a voltage threshold.

In more particular embodiments of such an air treatment system, the power characteristic is a current, and the monitor circuit includes a current monitor to monitor the current through the UV lamp and to provide a signal indicative of a state of current flow through the UV lamp. The controller is coupled to the current monitor to receive the signal, and to interrupt power supplied by the power source to the UV lamp when the signal indicates an erratic state of current flow through the UV lamp resulting from the voltage being less than the voltage threshold.

In other particular embodiments of such an air treatment system, the power characteristic is a voltage, and the monitor circuit includes a voltage monitor to monitor the voltage provided by the power source, and to provide a signal indicative of the voltage provided by the power source. The controller is coupled to the voltage monitor to receive the signal, and to interrupt power supplied by the power source when the signal indicates that the voltage is less than the voltage threshold.

In accordance with another embodiment of the invention, a method is provided for controlling at least one lamp. The method includes monitoring an AC power characteristic of a power source supplying power to the lamp. A signal representative of a voltage level of the power source is generated, based on the monitored AC power characteristic. Connection of the power to the lamp is controlled based on the generated signal. In this manner, lamp operation may be controlled based on power characteristics of the power source.

In more particular embodiments of such a method, monitoring the AC power characteristic includes monitoring the AC voltage of the power source that supplies power to the lamp. In such a case, generating a signal representative of the voltage level of the power source includes generating a signal identifying the voltage level of the power source. In other particular embodiments of such a method, monitoring the AC power characteristic of the power source includes monitoring the AC current provided by the power source to the lamp. In such a case, generating a signal representative of the voltage level of the power source includes generating a signal corresponding to a current flowing through the lamp, which is dependent on the voltage level of the power source.

In other particular embodiments of such a method, controlling connection of the power to the lamp includes controlling a switch coupled in a circuit path that includes at least the power source and the lamp. Control of the switch is based on the generated signal representative of the voltage level of the power source. In other particular embodiments, controlling the switch involves opening the circuit path via the switch when the generated signal indicates that the AC power characteristic is not sufficient to maintain an uninterrupted current flow through the lamp, and may also involve closing the circuit path via the switch in response to at least one predetermined event.

In other particular embodiments of such a method, controlling connection of the power to the lamp involves performing at least one power interrupt cycle. Such a power interrupt cycle includes removing power and restoring power to the lamp. For example, power provided by the power source to the lamp may be removed using at least one switch circuit, when the generated signal indicates that the AC power characteristic is insufficient to maintain a stable current flow through the lamp. Power provided by the power source to the lamp may be restored using the switch circuit in response to at least one predetermined event. In various embodiments, the predetermined event(s) includes, for example, any one or more of expiration of a predetermined time duration, expiration of a predetermined count value, occurrence of a predetermined time of day, and occurrence of an indication that the AC power characteristic is sufficient to maintain a stable current flow through the lamp. In more particular embodiments, the number of power interrupt cycles that are occurring may be tracked, such that the current number of power cycle interrupts may be compared to a predetermined power interrupt cycle value. When the current number of power interrupt cycles reaches the predetermined power interrupt cycle value, the operation state may be changed. For example, different actions may take place depending on the current operation state. As a more particular example, one of the operation states may include a termination state where power interrupt cycles are terminated.

In other particular embodiments of such a method, the lamp(s) may be positioned in an air duct arrangement in an air treatment system. For example, the lamp may be an ultraviolet (UV) lamp used as a germicide in the air treatment system.

BRIEF DESCRIPTION OF THE DRAWINGS

The invention is described in connection with the embodiments illustrated in the following diagrams.

DETAILED DESCRIPTION OF THE INVENTION

In the following description, reference is made to the accompanying drawings which form a part hereof, and in which is shown by way of illustration particular embodiments in which the invention may be practiced. It is to be understood that other embodiments may be utilized, as structural and operational changes may be made without departing from the scope of the present invention.

The present invention addresses operational lamp longevity, and more particularly provides a manner of mitigating the effects of low power line voltage and other poor power line regulation characteristics that can otherwise cause premature lamp mortality. Generally, the present invention provides a system and method for controlling UV lamp operation in brownout and other substandard supply voltage situations. The invention implements a monitor circuit for monitoring power characteristics relating to UV lamp operation, such as the UV lamp supply voltage or the current traversing the UV lamp. A controller operates in conjunction with the monitor circuit, by receiving a signal indicative of the state of the monitored power characteristics, and temporarily interrupting the power to the UV lamp when the signal indicates that the power source is currently failing to maintain a stable current flow through the UV lamp.

As set forth above, low line voltage conditions can result in excessive arcing and filament evaporation, which degrades the lamp filaments and decreases operational lamp longevity. However, lamp life can be preserved if proper controls are utilized during periods of stress, such as in the case of brownouts and otherwise poor power line regulation. The present invention provides such control to ensure that lamp life is not significantly effected by low line conditions, which improves product longevity and customer satisfaction.

Figure 1:
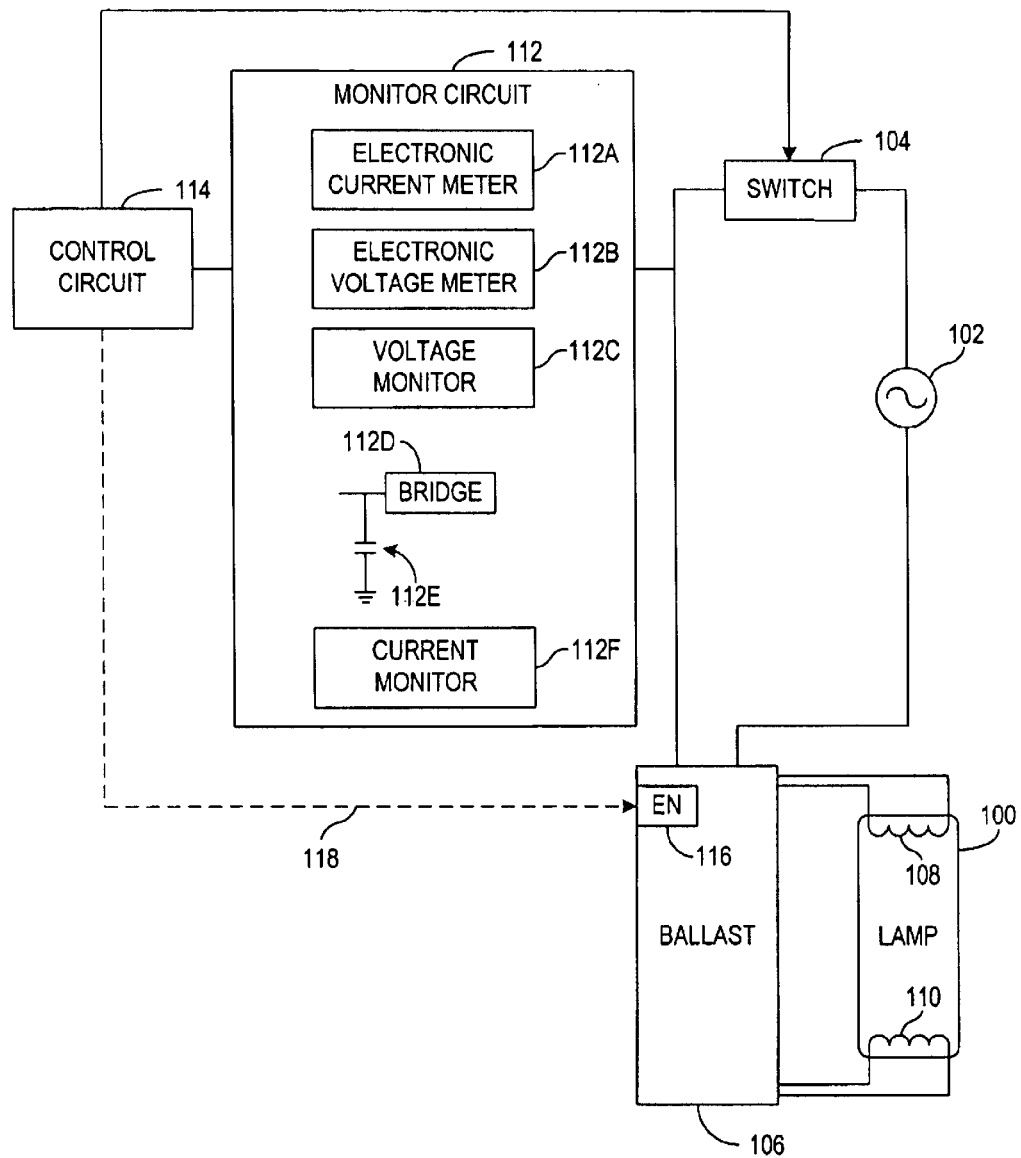
FIG. 1 is a block diagram of a power line monitor and interrupt system in accordance with one embodiment of the invention.

FIG. 1 is a block diagram of a power line monitor and interrupt system in accordance with one embodiment of the invention. One or more lamps 100, such as an ultraviolet (UV) lamp(s) used in an air treatment system, are powered by an AC power/voltage source 102. The AC power source 102 is provided by, for example, a utility company. In general, a switch 104 can be turned on, establishing an electrical circuit path from the voltage source 102 through the switch 104, the ballast 106, and the lamp 100. The ballast 106 may be any known type of ballast, such as a magnetic or electronic ballast. As is known in the art, a ballast is used to provide the requisite voltage to establish the arc that initially causes the lamp 100 to light. Alternatively, other devices capable of turning the UV lamp 100 on and off are equally applicable.

The UV lamp 100 can assume a variety of forms, such as a low pressure mercury lamp. The lamp 100 includes electrodes, shown as filaments 108, 110, between which current flows through the lamp 100. As previously described, a brownout or other low voltage condition of the voltage source 102 may cause degradation of the filaments 108, 110, ultimately causing premature lamp 100 mortality. The present invention addresses this problem, and controls the voltage/current to the filaments 108, 110 to protect the filaments during such low voltage conditions.

In accordance with the present invention, a monitor circuit 112 and a control circuit 114 are used to provide protection from premature lamp mortality. In one embodiment of the invention, the monitor circuit 112 monitors the voltage supplied by the power source 102 itself. For example, an electronic voltage meter 112B may be coupled to measure voltage between, for example, the power input to the switch 104 or ballast 106 and a reference voltage such as ground. The measured voltage signal may be converted at the electronic voltage meter 112B to a digital representation of the voltage, which can be provided to the control circuit 114. Alternatively, a voltage meter may provide an analog representation of the measured voltage, and analog-to-digital conversion (ADC) techniques may be used to provide a digital representation of the voltage to the control circuit.

In another embodiment of a manner for measuring the voltage of the power source 102, analog circuitry may be used to determine, for example, the RMS or peak voltage, which can then be compared to a predetermined analog voltage reference to determine whether the voltage provided by the power source 104 is below the predetermined voltage level. Any number of known techniques may be used to determine the RMS or peak voltage, such as coupling a bridge circuit 112D and appropriate capacitor(s) 112E across the voltage source 102. These and other voltage monitoring techniques using any voltage monitor 112C are well known in the art, and need not be described in further detail here.

In another embodiment of the invention, the monitor circuit 112 monitors current from the 120 VAC power source 102 at the input of the ballast 106, such as via the current monitor 112F. When the ballast 106 is on and the lamp(s) 100 is lit, current is flowing from one filament 108 to the other filament 110 through the gas. If the voltage source 102 is reduced such that a current cannot be maintained through the lamp 100, the current will exhibit properties different than those under normal operating conditions. For example, where the voltage source 102 exhibits low voltage characteristics, the current through the lamp 100 will become erratic. Therefore, in accordance with one embodiment of the invention, the AC current at the ballast 106 is monitored by the monitor circuit 112 when the switch 104 is closed to provide voltage to the ballast 106 and lamp 100. The monitor circuit 112 is shown in FIG. 1 to be in parallel with the circuit providing voltage/current to the lamp 100, however a series monitor circuit may also be implemented, such as the case of a series electronic current meter 112A. One particular implementation of a monitor circuit 112 is described more fully below.

In one embodiment, a control circuit 114 is also provided. The control circuit 114 of FIG. 1 is coupled to the monitor circuit 112 to receive one or more monitor signals from the monitor circuit 112, and to process the information accordingly. For example, in the case where the monitor circuit 112 is implemented as a current monitor, signals indicative of the current flow through the lamp 100 may be provided to the control circuit 114. From these signals and using a predetermined algorithm, the control circuit 114 determines whether current is flowing properly through the lamp 100. If not, the control circuit can provide switch control signals to the switch 104 to temporarily remove power to the ballast 106 and lamp 100. Removal of power from the lamp 100 for this time prevents repeated arcing between the filaments 108, 110 of the lamp, and therefore minimizes filament evaporation and extends lamp life. After a desired time, the control circuit 114 can again turn on the switch 104, thereby restoring voltage to the lamp 100. The current through the lamp 100 is again monitored to determine whether the current through the lamp 100 exhibits expected properties. This monitoring, power removal, power restoration, and continued monitoring of the lamp 100 current can be performed a predetermined number of times, for a predetermined time duration, or until some other predetermined event occurs. Thus, representative examples of predetermined events allowing power to be restored include expiration of a predetermined time duration, expiration of a predetermined count value, a time of day, a signal indicating acceptable source voltage levels have returned, etc.

Where brownout or other low voltage conditions have occurred, normal current characteristics in the lamp 100 should return when the voltage of the AC power source 102 has returned to a proper level. In this manner, lamp life can be preserved in low voltage situations.

It should be noted that manners of controlling the power may be utilized other than (or in addition to) controlling a supply relay or switch. For example, some electronic ballasts come equipped with an enable input, which allows a ballast output control signal to be received at the ballast. Such a ballast will include a mechanism for disabling its power output (e.g., open circuiting the circuit path between the power source and the lamps) in response to a first ballast output control signal, and for enabling its power output (e.g., connecting the circuit path between the power source and the lamps) in response to a second ballast control signal. Thus, an enable signal can be provided from the control circuit 114 to the enable input 116 of the ballast 106, as shown by dashed line 118, rather than (or in addition to) having the control circuit 114 control the switch 104. If the first ballast output control signal is provided by the control circuit 114 to the enable input 116 of the ballast 106, the ballast 106 will open circuit the current path to the lamp 100. If the second ballast output control signal is provided by the control circuit 114 to the enable input 116 of the ballast 106, the ballast 106 will short circuit the current path to the lamp 100. In another embodiment, such an enable input and current control mechanism may be provided on the lamp(s) itself. Other lamp power control mechanisms may also be used, and the present invention is applicable regardless of the particular current control scheme desired.

Figure 2:
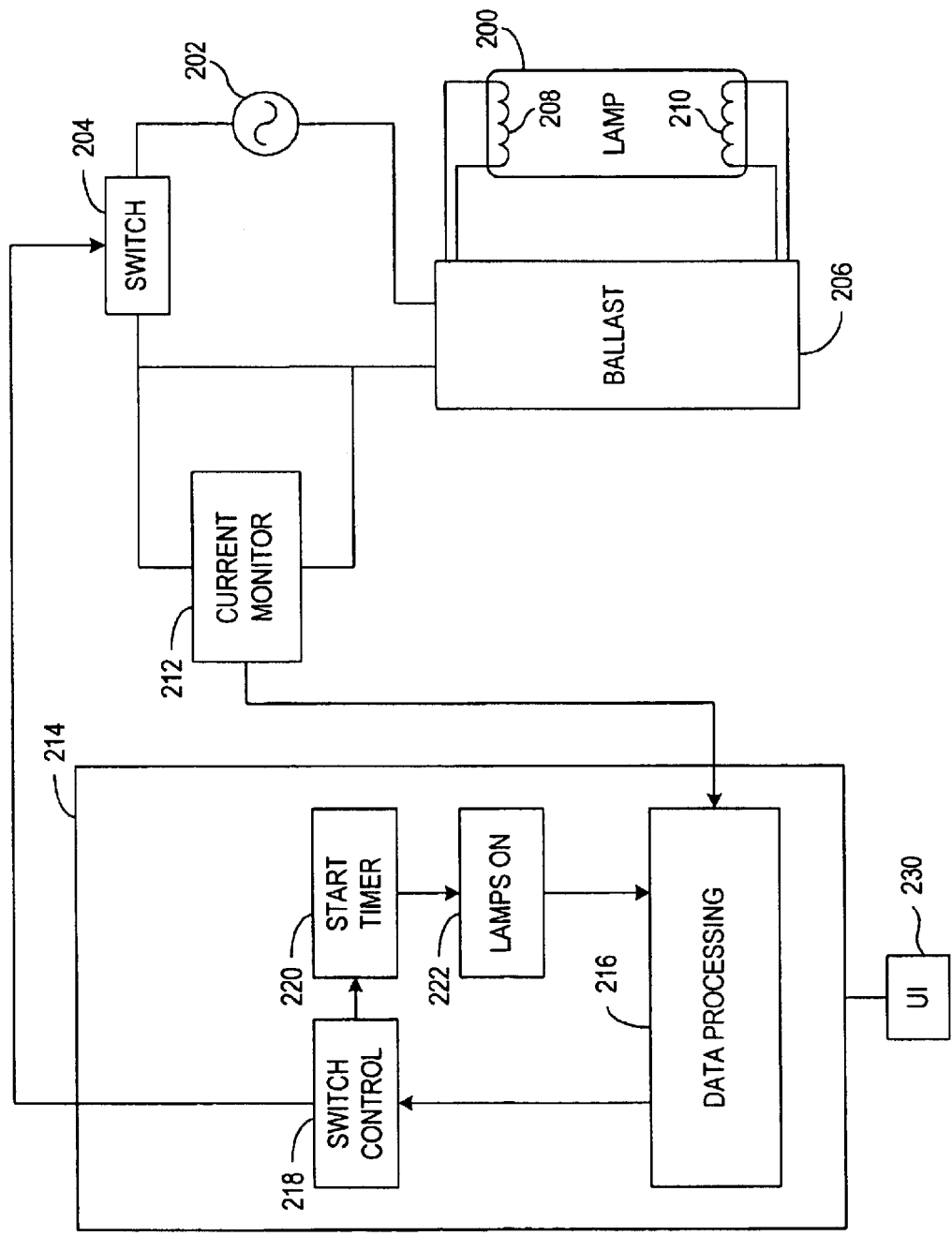
FIG. 2 is a block diagram of a power monitor and interrupt circuit in accordance with a more particular embodiment of the invention.

FIG. 2 is a block diagram of a power monitor and interrupt circuit in accordance with another embodiment of the invention. As was described in connection with FIG. 1, one or more UV lamps 200 are provided, which are powered by an AC voltage source 202. Closing switch 204 establishes an electrical circuit including the voltage source 202, switch 204, ballast 206, and lamp(s) 200. When the AC voltage source 202 is properly regulated and providing power within an expected range, current can properly flow between the filaments 208, 210 of the lamp 200. During periods of low voltage, flickering can occur. As described above, this situation results in increased bombarding of the cathode by ions which accelerates the sputtering of cathode material atoms, eventually leaving the filament thinner in some areas and leading to premature lamp mortality.

In accordance with one embodiment of the invention, a current monitor 212 is used to monitor for proper lamp operation. A particular example of one current monitor that may be used in accordance with the present invention is described in connection with FIG. 3. Generally, however, this embodiment involves monitoring for "zero crossings" of the current entering the ballast 206. Monitoring for zero crossings provides an indication of whether current is properly flowing between the filaments 208, 210 of the lamp 200. More particularly, the current monitor 212 monitors for zero crossings in a standard 60 Hz AC source signal, where the zero crossings occur 120 times per second. However, the current monitor 212 may be used with any particular source signal frequency. For example, many European countries operate on a 50 Hz source signal frequency, and in such a case, the current monitor 212 monitors for zero crossings 100 times per second.

Assuming a 60 Hz signal for purposes of discussion, current can be deemed to be flowing properly between the filaments 208, 210 if the current is flowing in each of the 120 time intervals occurring each second. When current is not properly flowing between the filaments 208, 210 and the lights are flickering due to low line voltage, the current may be erratic, thereby exhibiting gaps in the current flowing through the lamp 200. For example, during brownout conditions, the lamp 200 may need to reestablish an arc between the filaments 208, 210, at which time the current is not flowing normally between the filaments 208, 210 during one or more of the 120 time intervals. This can be detected by the current monitor 212, and the results may be processed by a control circuit, an example of which is shown as control circuit 214 of FIG. 2.

The control circuit 214 shown in FIG. 2 may be implemented in a variety of manners. In the illustrated embodiment, the control circuit 214 may be implemented using a microprocessor, microcontroller, or other processing arrangement where at least some of the functions are controlled using a software program(s). In other embodiments, discrete hardware components may be implemented, or a combination of discrete and software-based circuitry. The control circuit 214 may include, for example, a data processing module 216. For example, the data processing module 216 may represent a processing module that performs functions as dictated by one or more programs, and memory to temporarily and/or permanently store information during such processing.

Initially, the data processing module 216 may be used to close a relay or other switching mechanism, such as switch 204, in order to initially provide power to the lamp(s) 200. More particularly, an input may be provided to the control circuit 214 indicating that power to the lamp(s) 200 is desired. Such an input may be provided via a user interface (UI) 230 to the control circuit 214, such as a button, switch, touch screen, voice command, or other user interface mechanism. This input is recognized by the data processing module 216, which in turn closes the switch 204 by way of the switch control 218. This switch control 218 may take on various forms. For example, the switch control 218 may simply represent a register storing appropriate data to provide as a signal to an electronic switch 204 to turn on the switch 204. Alternatively, the switch control 218 may represent a driver circuit to drive a signal to a relay or other switch 204 to turn on the switch. Thus, the switch control 218 represents any switch control mechanism used to control the operation of a relay, switch, or other mechanism controlling the power to the ballast 206 and lamp 200.

When the switch 204 is initially turned on and power is thereby provided to the lamp 200, a predetermined time period may be established to allow the lamp(s) 200 to properly start. For example, once the switch 204 has been turned on, a start timer 220 may be started, where such a timer 220 may be implemented in hardware, software, or a combination thereof. In one embodiment, the start timer 220 is implemented in software operable on a processing device. The start timer 220 sets a register, flag, memory location, or other indication that the lamp(s) are "ON," as depicted by the LAMPS ON block 222, upon expiration of the predetermined timer 220 period. For example, this time period may be on the order of a number of seconds, such as three seconds, five seconds, forty seconds, or other predetermined time in which proper lamp 200 operation is expected after power has been applied thereto. During this time, the ballast 206 will be connected to the power source 202 via the switch 204, the filament will heat up, strike the arc, and current will begin to flow through the gas between the filaments 208, 210 of the lamp(s) 200. At the expiration of the start timer 220, it is expected that current is properly flowing through the lamp(s) 200, and the LAMPS ON 222 indicator will be set.

The data processing module 216 receives information from the current monitor 212 indicative of the state of the current flow through the lamp(s) 200. In one embodiment of the invention, the current monitor 212 identifies whether current is properly flowing through the lamp 200 during a predetermined number of time intervals separated by zero crossings of the time-varying current signal. This embodiment assumes a standard current signal having both positive and negative amplitudes which has such zero crossings; however any current/voltage level may be selected as the reference points. For example, a time-varying current signal may be shifted such that the current signal is always positive, in which case zero crossings may not be the reference point but rather a predetermined amplitude greater than zero may be selected (e.g., an amplitude substantially centered about the peaks of the time-varying signal).

In an exemplary embodiment, processing of data provided by the current monitor 212 will not occur until (and unless) the LAMPS ON 222 indicator is set. The data processing module 216 processes this information, and determines whether the number of time intervals in which current is not properly flowing has reached the predetermined number of such time intervals. In one embodiment, if three consecutive time intervals (e.g., approximately 25 ms in the case of a 60 Hz voltage signal) indicate a lack of properly flowing current through the lamp(s) 200, the data processing module 216 assumes that the lamp 200 has experienced a low voltage or brownout condition that has caused the current in lamp(s) 200 to fail to flow properly which can damage the lamp(s) 200. Any predetermined number of consecutive (or non-consecutive) time intervals may be used to indicate such a condition, and three consecutive time intervals merely represents one embodiment of the invention. Where the predetermined condition has been met, the data processing module 216 and associated switch control 218 provide a signal to turn off the switch 204, at least temporarily, to avoid damage to the lamp(s) 200 in the event of a low source voltage condition. After a predetermined time in which the lamp(s) 200 have been shut off in this manner, power may again be restored to the lamp(s) 200 to determine if lamp 200 operation has returned to normal. For example, if a brownout condition has passed such that the source voltage is again within a proper range, the lamp(s) 200 may operate properly upon restoration of power to the lamp(s) 200. Particular examples of illustrative power removal and restoration operations are described more fully below.

Figure 3:
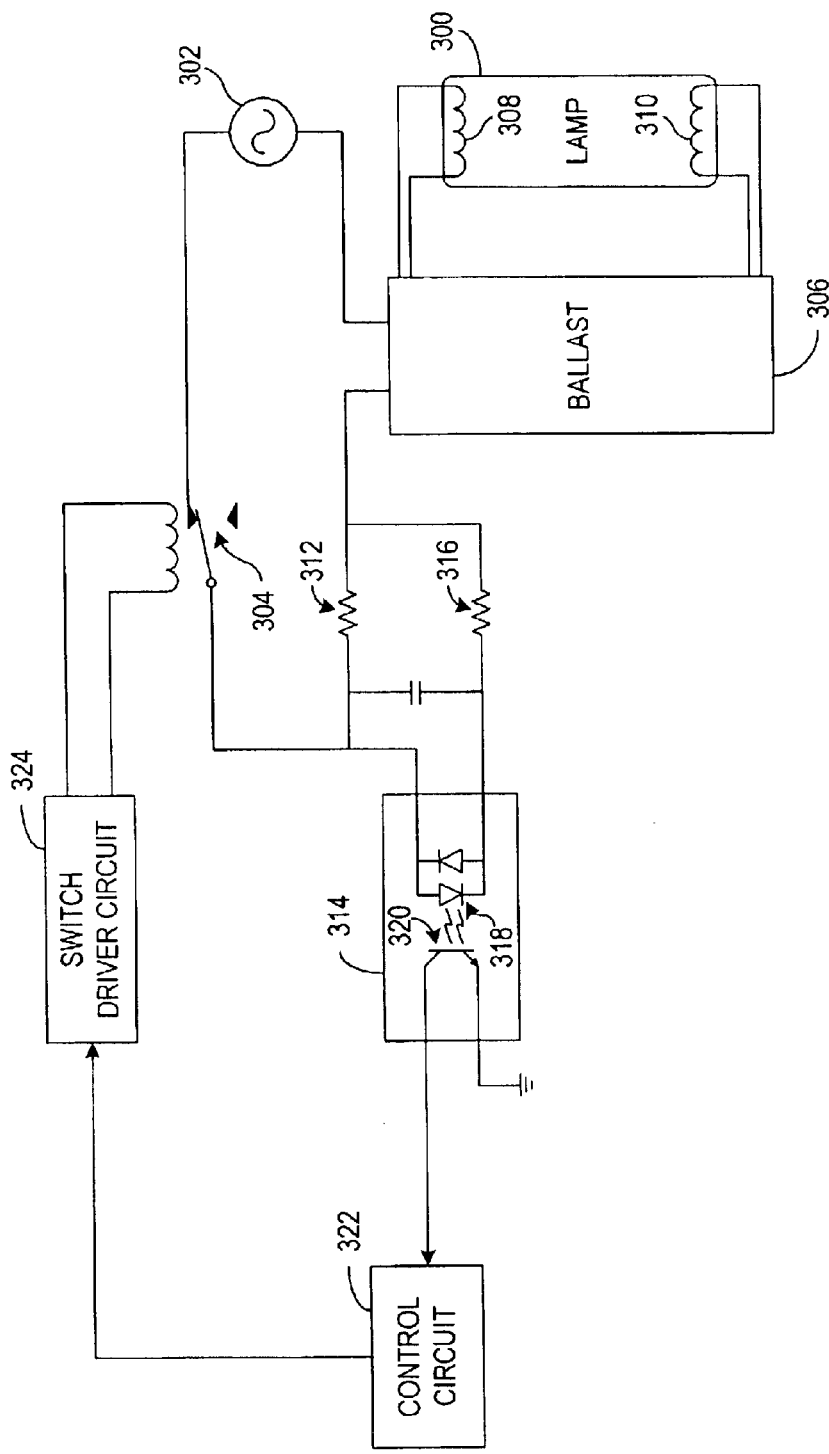
FIG. 3 is a schematic diagram of one embodiment of a current monitor circuit used to determine low voltage/brownout conditions in accordance with the present invention.

A number of different current and/or voltage monitoring schemes may be used to determine whether a brownout or other low voltage condition exists. One embodiment of a current monitoring implementation is illustrated in FIG. 3. FIG. 3 is a schematic diagram of one embodiment of a current monitor circuit used to determine low voltage/brownout conditions in accordance with the present invention. Again, one or more UV lamps 300 are provided, which are powered by an AC voltage source 302. In the illustrated embodiment, closing relay 304 establishes an electrical circuit including the voltage source 302, relay 304, resistance 312, ballast 306, and lamp(s) 300. When the AC voltage source 302 is properly regulated and providing power within an expected range, current can properly flow between the filaments 308, 310 of the lamp 300.

In the illustrated embodiment, brownout or other low voltage conditions are detected by monitoring the current through the lamp(s) 300. Where multiple lamps 300 are provided, additional circuitry may be provided to monitor the current through those lamps. For purposes of discussion, the circuit of FIG. 3 is assumed to power one lamp 300. In the illustrated embodiment, one side of the relay 304 is coupled to a series resistance, illustrated as resistor 312, which is in turn coupled to the ballast 306. The relay 304 is also coupled to an opto-isolator circuit 314, through another resistor 316, which is in turn also coupled to the ballast 306. In one embodiment of the invention, resistor 316 is significantly larger than parallel resistor 312, so that most of the current flows through resistor 312, but a portion of the current flows through the opto-isolator 314 and resistor 316 to monitor the current. For example, resistor 312 is approximately 3.3 ohms and resistor 316 is approximately 68 ohms in one embodiment of the invention. The resistances may be provided in any desired manner, such as using one or more resistor components, transistor-based resistances such as voltage-controlled resistors, and the like.

When the relay 304 is on, most of the current (based largely on the voltage division created by the parallel resistances 312, 316) flows through resistor 312. However, a small portion of the current flows through the opto-isolator 314 diodes 318 and through resistor 316 to the ballast 306. When the current is at or above a predetermined level, the opto-isolator diodes 318 will turn on. A photo-transistor 320 senses when the diodes 318 are conducting current. Using a pull-up resistance (not shown) at the collector of the photo-transistor 320, the control circuit 322 can sense when a sufficient quantity of current is flowing in the ballast 306 and ultimately in the lamp 300. Thus, the opto-isolator 314 turns on during one half of a current cycle of sufficient quantity, turns off during the zero crossing, and turns on again for the next half current cycle of sufficient quantity. This creates a pulse signal at the output of the opto-isolator 314 that pulses 120 times per second for a 60 Hz signal.

The control circuit 322 recognizes the pulses, and can determine whether current is flowing through the ballast 306 and lamp 300 during each of these half cycles. If a pulse is missing, it indicates that the current through resistance 316 (and accordingly through resistance 312, the ballast 306, and the lamp 300) is insufficient, which may ultimately indicate a voltage from the voltage source 302 that is insufficient. If a predetermined number of such pulses are missing, the control circuit 322 provides a signal to the switch driver circuit 324 to switch the relay 304 to the off position, thereby removing power from the lamp 300. In one embodiment of the invention, three consecutive missing pulses are recognized by the control circuit 322 as an insufficient current, which triggers the switch driver circuit 324 to switch the relay 304 to the off position. This will turn off the lamp 300, thereby protecting the lamp 300 from the damaging effects of an insufficient voltage signal.

Power can be restored to the lamp 300 after a predetermined time or in connection with a predetermined event, and in one embodiment can cycle between applying power and disabling power to the lamps. This essentially suspends power to the lamps during periods of low source voltage, and restores power when the voltage has possibly returned to normal levels. Such a cycle can continue indefinitely, for a predetermined time, or until a predetermined event(s) has occurred, as is described more fully below.

Figure 4:
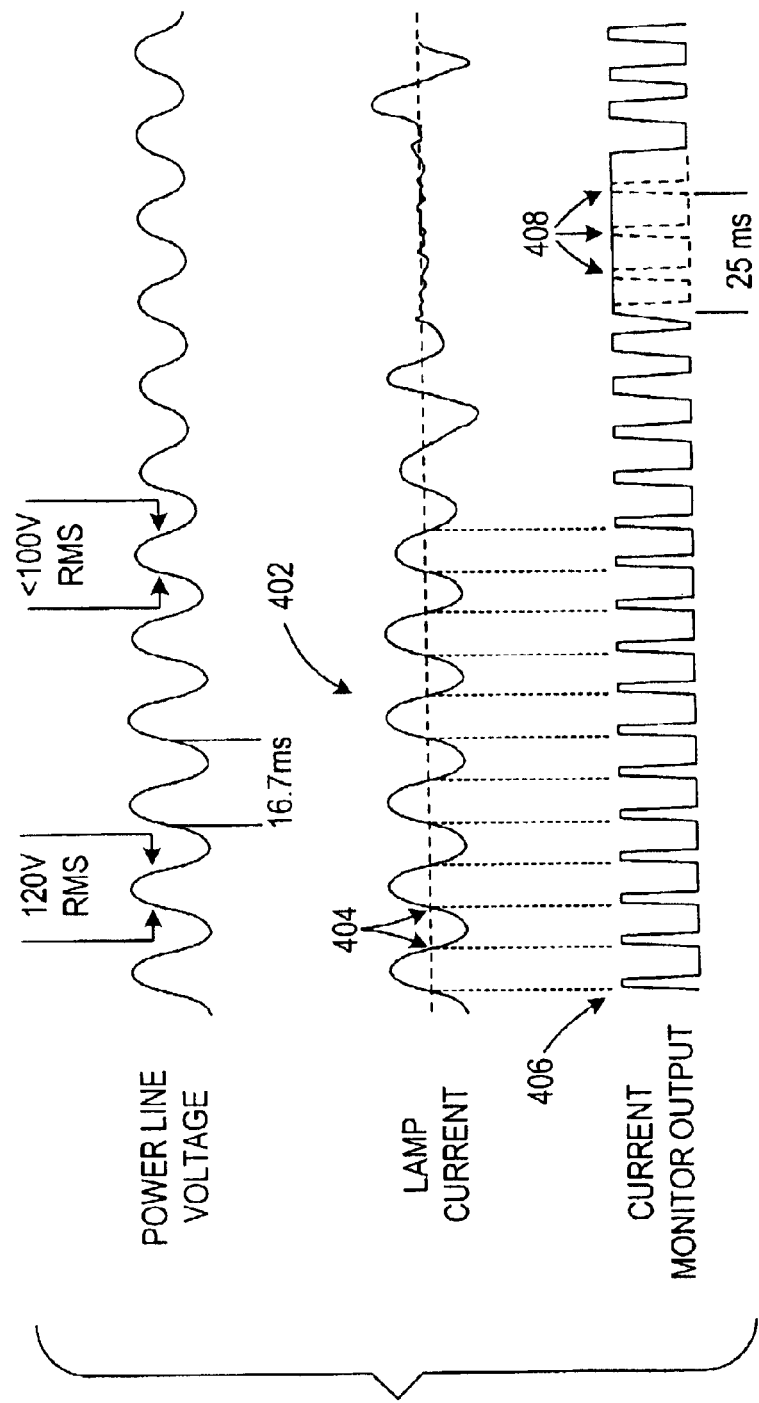
FIG. 4 is a timing diagram generally illustrating one manner in which current may be monitored by a current monitor circuit.

FIG. 4 is a timing diagram generally illustrating one manner in which current may be monitored by a current monitor circuit as described in connection with FIG. 3. The illustrated power line voltage 400 is represented by a sinusoidal voltage signal having a frequency of approximately 60 Hz, and exhibiting approximately 120V RMS. When the voltage signal 400 is at a proper voltage level, such as 120V RMS, the lamp current signal 402 operates as expected. The current monitor circuit discussed in connection with FIG. 3 monitors the zero crossings of the lamp current, as depicted by representative zero crossings 404. A pulse may be generated at each zero crossing, as illustrated by the current monitor output 406. The amplitude and/or frequency of the voltage signal can degrade during a brownout period, as illustrated by the portion of the voltage signal 400 exhibiting approximately 100V RMS or less. Where the power line voltage 400 drops below a certain level (e.g., 100V RMS), the lamp current may cease to oscillate properly and may become erratic due to, for example, lamp "flickering." When this occurs, the opto-isolator associated with the current monitor of FIG. 3 will not properly generate the pulses at the zero crossings, as depicted by the dashed pulses 408. Rather, the pulses may characteristically change, such as a change in duty cycle. Furthermore, the pulses may temporarily cease to oscillate properly, causing temporary lapses in the pulse signal. Therefore, during brownout or other low source voltage conditions, the lamp current and the pulses representative of the lamp current become erratic. In one embodiment, if three consecutive pulses 408 are not recognized such that no proper lamp current 402 is present for a corresponding amount of time (approximately 25 ms in this example), the control circuit will cause the switch/relay to open, thereby removing power from the lamp.

A variety of other manners of measuring the current through the UV lamps may be used in connection with the present invention. For example, an electronic current meter may be used to directly measure the current on a continuous basis, and provide the resulting signal to a control circuit for analysis. Further, the voltage of the voltage source itself may be monitored in lieu of monitoring lamp current, using a variety of voltage monitoring techniques. For example, a bridge circuit and appropriate capacitance may be used to determine a voltage commensurate with the RMS signal voltage or other predetermined voltage level. Any desired manner of monitoring the AC supply voltage may be used. The resulting monitored signal may be analyzed by a control circuit, such as the control circuits 214 and 322 described in connection with FIGS. 2 and 3 respectively. As previously described, the control circuit will operate to ultimately control the relay or other switch to remove power from the ballast and lamp(s) during times of insufficient voltage.

The present invention may be used in a variety of different UV lamp applications. The present invention is particularly beneficial in UV lamp applications where temporary suspension of lamp operation is acceptable. For example, UV lamps may be used in situations where the light emitted therefrom is not continuously required. For example, the UV lamps may be used to provide ultraviolet exposure for medical, horticultural, air treatment, and other purposes where temporary suspension of lamp operation may be acceptable. Where the UV lamp is in the form of a fluorescent light used to provide indoor lighting, complete suspension of lamp operation may be unacceptable or otherwise inconvenient. On the other hand, fluorescent or other gas lighting applications may be used in conjunction with other lighting schemes, or may be powered by separate voltage sources in which the present invention may be highly beneficial to preserve the life of the UV lamps. In any event, the present invention is applicable in any UV lamp application where temporary suspension of lamp operation is not unduly inconvenient nor prohibitive to continued operation of the underlying system in which the lamp(s) is utilized.

One UV lamp application in which the present invention is particularly useful is in the context of air treatment systems. Airborne bacteria, mold, and other germs often have adverse implications to humans. These germs can be circulated through an air handling system, such as a heating and/or cooling systems. Germs such as mold may also aggregate as surface mold on air conditioning and other air handling components. Ultraviolet light can be used to reduce or substantially eliminate mold, bacteria, and other germs in such air treatment systems. Generally, one or more UV lamps may be positioned within the plenum and/or attached air ducts of an air handling system, and in some cases positioned proximate air conditioner cooling coils where moisture from condensation provides a breeding ground for mold and other germs. The highly-effective germicide provided by UV treatment can significantly improve the air quality in residential and commercial settings.

Because the UV lamps are positioned within the ductwork of air handling systems and are generally not used for visible lighting purposes, it is not imperative that the UV lamps remain on at all times. While it is important to keep such UV lamps operative in order to serve their intended purpose, lamp operation can be temporarily suspended under certain circumstances, without having a significant impact on the ultimate goal of eradicating germs. In brownout and other low voltage situations, it would be desirable to temporarily suspend UV lamp operation in order to prevent premature lamp mortality. Therefore, while the present invention is applicable in a variety of different UV lamp applications, it is particularly beneficial in the context of germ control in air handling systems.

Figure 5:
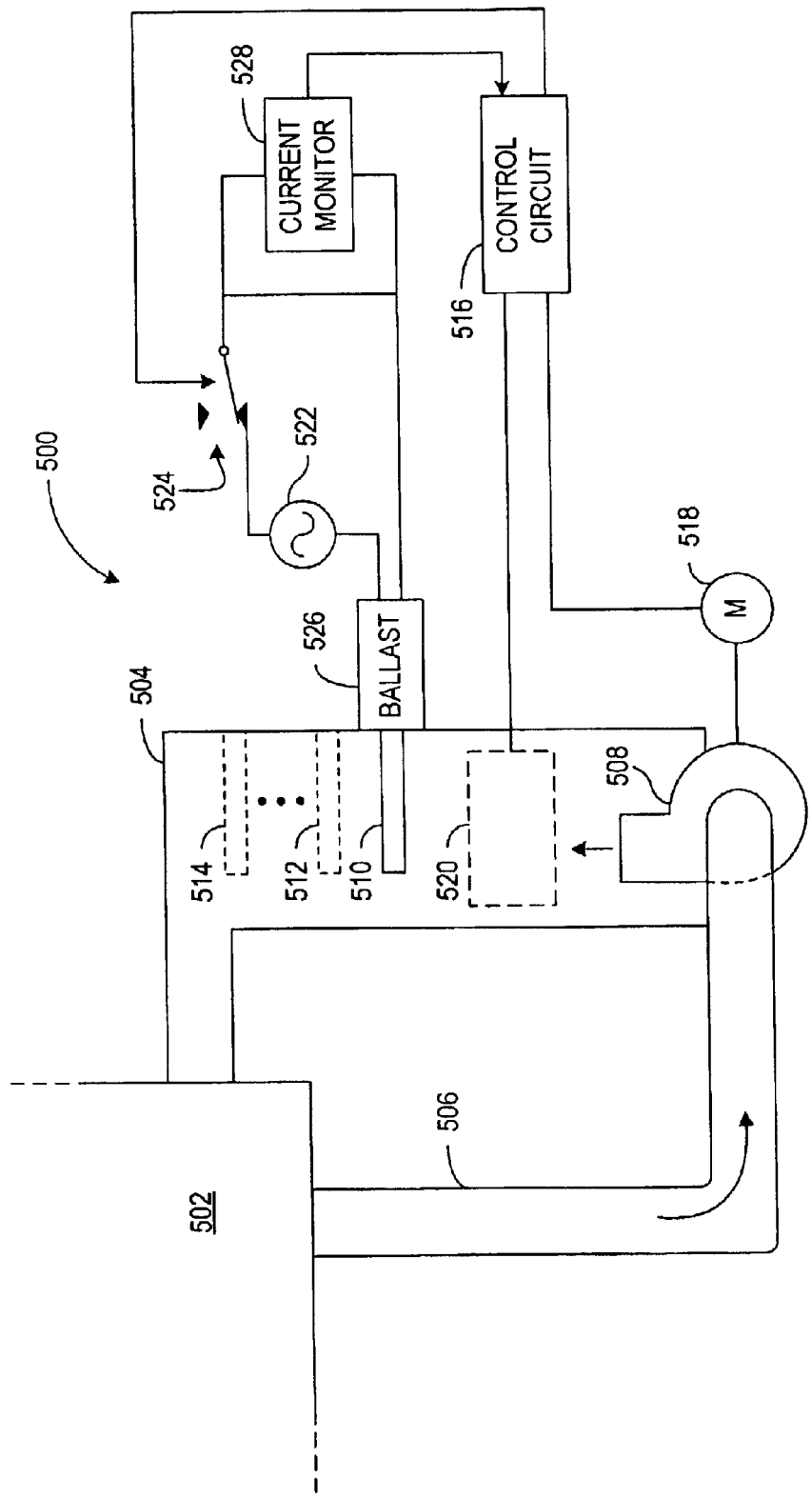
FIG. 5 is a block diagram illustrating one embodiment of the present invention as used in an air handling system.

FIG. 5 is a block diagram illustrating one embodiment of the present invention as used in an air handling system. In this representative example, a UV air handling system 500 is used to circulate air, possibly heated or cooled air, within the area 502. The air handling system 500 generally circulates air throughout the area 502 by employing a duct system. The duct system includes, for example, a plenum and associated ductwork 504 to provide air to the area 502, and one or more return air ducts 506. The blower 508 is in fluid communication with the return air duct 506 and the source air duct 504, to draw air from the area 502 via the return air duct 506 and provide air to the area 502 via the source air duct 504. The source air duct 504 may divide into a plurality of individual ducts having outlets at various locations within the area 502. Similarly, a plurality of return air inlets and corresponding ducts may be used within the area 502, which aggregate into the return air duct 506.

One or more UV lamps operating as a germicide may be positioned within the source air ductwork 504 as depicted in FIG. 5, or alternatively (or additionally) may be positioned within the return air ductwork 506. Various numbers of UV lamps may be provided, as depicted by UV lamps 510, 512, through 514. The number and position of UV lamps depends on a number of factors, including the size and wattage of the lamps, size of the area 502 and/or ductwork, desired level of germicide protection, etc. One or more UV lamps 510, 512, 514 can be controlled during brownout and other low voltage conditions in accordance with the principles of the present invention. For ease of description, the following description is described in terms of a single UV lamp 510, although the principles described herein are equally applicable to multiple UV lamps.

A control circuit 516 may be used to control various components of the air handling system, such as to control a motor 518 for the blower 508, to control a heat exchanger 520, cooling components (not shown), and the like. The control circuit 516 may also be used to automatically control power to the UV lamp 510 during periods of low supply voltage, in a manner analogous to that described in connection with FIGS. 1–4. More particularly, the UV lamp 510 is powered by an AC voltage source 522 through the switch 524 and the ballast 526 (or other similar functional device). A voltage or current monitor circuit, depicted as a current monitor circuit 528 in the illustrated embodiment, is used in connection with the control circuit 516 to provide protection from premature UV lamp 510 mortality. In one embodiment of the invention, the monitor circuit 528 monitors current from a 120 VAC power source 522 at the input of the ballast 526. When the ballast 526 is on and the UV lamp 510 is operating, current flows between the filaments and through the gas of the UV lamp 510. If the voltage source 522 is reduced such that a current cannot be maintained through the UV lamp 510, the current will exhibit properties different than those under normal operating conditions. For example, where the voltage source 522 exhibits low voltage characteristics, the current through the UV lamp 510 will become erratic or otherwise fail to flow properly. Therefore, in accordance with one embodiment of the invention, the AC current at the ballast 526 is monitored by the current monitor circuit 528 when the switch 524 is closed to provide voltage to the ballast 526 and UV lamp 510.

The control circuit 516 is coupled to the monitor circuit 528 to receive one or more monitor signals from the monitor circuit 528, and to process the information accordingly. For example, in the case where the monitor circuit 528 is implemented as a current monitor, signals indicative of the current flow through the UV lamp 510 may be provided to the control circuit 516. Using these signals, the control circuit 516 determines whether current is flowing properly through the UV lamp 510, as previously described. If current is not properly flowing through the UV lamp 510, or the voltage provided by power source 522 is otherwise determined to be insufficient to provide proper lamp current, the control circuit 516 can provide switch control signals to the switch 524 to temporarily remove power to the ballast 526 and UV lamp 510. Temporary removal of power from the lamp 510 prevents repeated arcing between the filaments of the UV lamp 510, and therefore minimizes filament evaporation and extends lamp life.

After a desired time or in connection with a desired event, the control circuit 516 can again turn on switch 524, thereby restoring voltage to the UV lamp 510. The current through the UV lamp 510 is again monitored by the current monitor 528 to determine whether the current through the lamp 510 exhibits expected properties. This cycle of monitoring, removing power to the UV lamp 510, restoring power to the UV lamp 510, and repeated monitoring of the UV lamp 510 current can be performed a predetermined number of times, for a predetermined time duration, or until a predetermined event occurs. Where brownout or other low voltage conditions have occurred, normal current characteristics in the lamp 510 should return when the voltage of the AC power source 522 has returned to a proper level.

Figure 6:
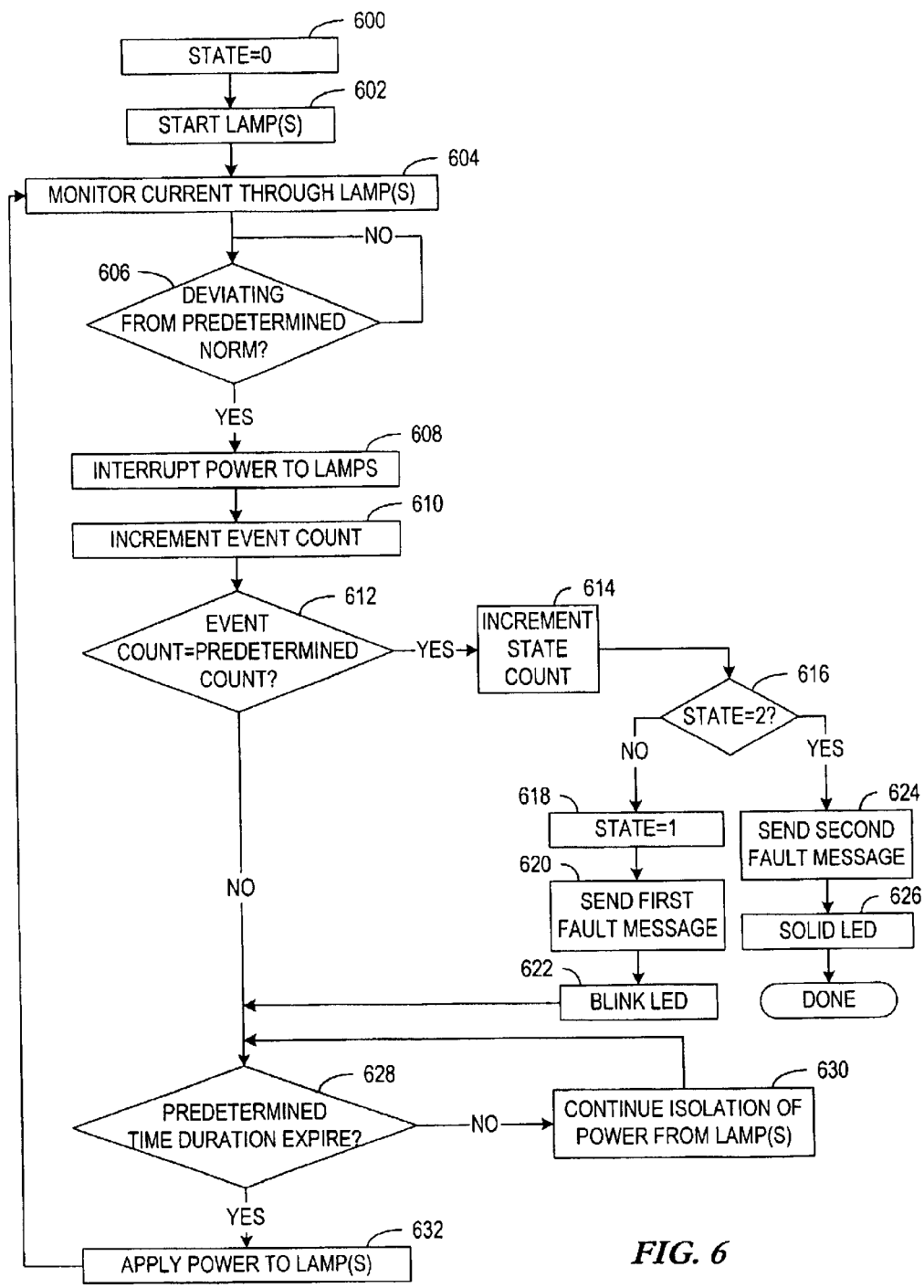
FIG. 6 is a flow diagram illustrating one embodiment of a method for controlling UV lamp operation during brownout or other sub-standard power periods in accordance with the principles of the present invention.

FIG. 6 is a flow diagram illustrating one embodiment of a method for controlling UV lamp operation during brownout or other sub-standard power periods in accordance with the principles of the present invention. The illustrated embodiment includes multiple "states" in which the UV lamp control system may be operating. Depending on the particular state of the UV lamp control, different actions may be taken, as is described more fully below. The control system is initially in a first state, shown as state-0 600. The lamp(s) is started 602 by applying power to the ballast and lamp(s). In one embodiment, a predetermined time duration, such as five seconds, twenty seconds, etc. is allowed to pass before lamp current monitoring is initiated. When the predetermined time duration has passed, the current through the lamp(s) is monitored 604. If the current deviates from a predetermined norm as determined at decision block 606, power to the lamp(s) is interrupted 608.

In one embodiment of the invention, monitoring for a deviant or otherwise unacceptable supply voltage can occur multiple times for each state of the control operation. For example, if the control operation determines that the lamp current deviates from the norm a predetermined number of times, the state may be changed and/or events can be triggered to provide an indication of the failure mode. To assist in this manner, an event count can be established. In such a case, each time a lamp current deviation is discovered, an event count can be incremented as shown at block 610. If the event count reaches a predetermined event count as determined at decision block 612, the state count is incremented 614, and further action can be taken depending on the new state of the control system. For example, in an implementation including three states (i.e., state-0, state-1, state-2), it is determined 616 whether the new state equals state-2. If not, the state equals state-1 as shown at block 618, and a first set of actions can be taken due to the control system's entry into state-1. For example, a first fault message can be sent 620 such as a communication message sent to a local user interface and/or a remote site where such a communication system is installed. In one embodiment, the communication message may be sent via the EnviraCOM™ Environmental Control Communications Network, which is a flexible, open specification introduced by Honeywell Inc. of Golden Valley, Minn., U.S.A. Such a message may indicate that an extended brownout period is being experienced. Other indications, such as a blinking LED indicator 622, may also be provided.

If the new state equals state-2 as determined at decision block 616, other actions may be taken, such as sending 624 a second fault message and providing a solid LED indication as shown at block 626. The second fault message may indicate, for example, that an extended brownout or other low voltage condition has occurred, or that another failure condition has occurred. Other failure conditions may be presumed in response to the extended and unsuccessful attempts to establish a proper operating current in the UV lamp. In such a case, further control actions may be suspended until the failure condition is properly addressed.

Where the event count has not reached the predetermined event count as determined at decision block 612, or has reached the predetermined event count but has not entered the final terminating stage of the control operation, it may be determined 628 whether a predetermined time duration has expired. For example, in one embodiment of the invention, the temporary power suspension to the lamp(s) is set to approximately one hour, although any time duration may alternatively be selected. Therefore, the temporary isolation of power to the lamps is continued as shown at block 630, until the predetermined time duration expires. When the predetermined time duration expires, power is again applied to the lamp(s) as shown at block 632, and control operation returns to block 604 where the lamp current is again monitored.

A method in accordance with the embodiment illustrated in FIG. 6 will therefore cause the supply voltage to be disconnected from the ballast/lamp when the lamp current appears to be inadequate due to insufficient supply voltage. After multiple, temporary power interrupts to the lamp(s) have occurred, various predetermined actions can be taken. For example, assume that three states are provided, the predetermined time duration is approximately one hour, and the predetermined event count is twenty-four. In this case, the control will continuously reapply power to the lamp(s) every hour for a twenty-four hour period, after which the control system will enter a second state if lamp current continues to be unstable. When in the second state, a first fault message may be sent indicating an extended brownout period, and perform other operations such as blinking a visual failure indicator. Then, the control system may again continuously reapply power to the lamp(s) every hour for a second twenty-four hour period, after which a third state will be entered if unsuccessful. In the third state, a second fault message may be sent indicating, for example, that continued low voltage is being experienced or that some other failure has occurred, and a second visual failure indicator may be provided such as a solid (i.e., non-blinking) LED indication. At such time, the control operation may be discontinued until the voltage source has returned to a proper operating level, the circuit fault has been fixed, the system is reset, etc. At any time in which the lamp current is successfully re-established, the fault messages may be discontinued, the event counter may be cleared, and any other indications such as visual failure indications may be reset to a normal mode (e.g., LED turned off).

Further, the invention contemplates any number of states, any desired time durations, any desired event count, or any combination thereof, and the present example is merely provided for purposes of facilitating an understanding of this aspect of the invention. For example, a single state can be provided, where power is applied every half hour for forty-eight hours. A virtually unlimited number of permutations exist, any of which may be employed in connection with the present invention.

Figure 7:
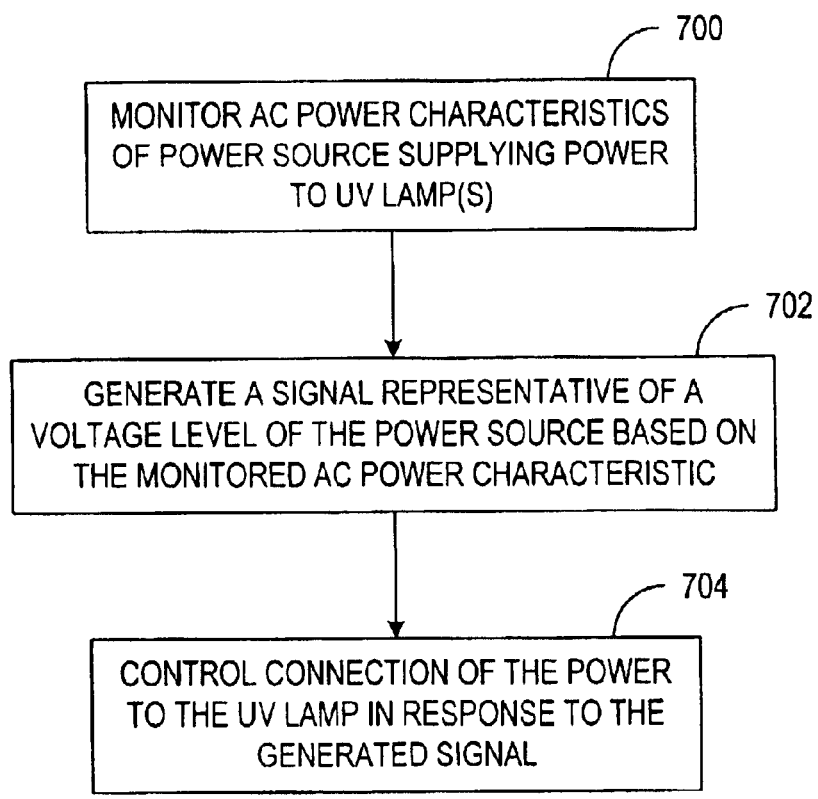
FIG. 7 illustrates a more general embodiment of a method for controlling UV lamp operation during brownout or other sub-standard power periods in accordance with the present invention.

FIG. 7 illustrates a more general embodiment of a method for controlling UV lamp operation during brownout or other sub-standard power periods in accordance with the present invention. In the illustrated embodiment, one or more AC power characteristics of the power source that is supplying power to the UV lamp(s) are monitored 700, and a signal representative of a voltage level of the power source is generated 702 based on the monitored AC power characteristics. For example, the AC power characteristics may include an AC voltage of the power source supplying power to the UV lamp. In such a case, generating 702 the signal involves generating a signal identifying the voltage level of the power source. In another example, the AC power characteristic may include an AC current of the power source. In this case, generating 702 the signal involves generating a signal corresponding to the current flowing through the UV lamp, as the current flowing through the UV lamp is dependent on the voltage level of the power source.

In any case, the electrical connection of the power to the UV lamp is controlled 704 in response to the generated signal. For example, if the generated signal indicates that current is not flowing properly through the UV lamp, this may indicate a low supply voltage, and the power can be temporarily disconnected from the UV lamp. In one embodiment, this temporary disconnection is effected by controlling a switch coupled between the power source and the UV lamp (or the ballast coupled to the UV lamp). In a more particular embodiment, controlling the switch may involve opening the switch when the generated signal indicates that the AC power characteristic is insufficient to maintain a stable current flow through the UV lamp. Controlling the switch may also include closing the switch when the generated signal subsequently indicates that the AC power characteristic is sufficient to maintain a stable current flow through the UV lamp.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A control system for preserving lamp life under brown-out conditions of an AC utility power source, comprising:
   an AC ultraviolet lamp positioned in an air duct for treatment of air flow;
   a monitor circuit coupled to monitor at least one power characteristic of the AC utility power source and to provide a signal indicative of the power characteristic in response thereto; and
   a controller coupled to the monitor circuit to receive the signal, and to interrupt power supplied by the AC utility power source to the AC ultraviolet lamp when the signal indicates that a voltage of the AC utility power source is less than a voltage threshold.

2. The control system as in claim 1, wherein the power characteristic comprises a current, and wherein the monitor circuit comprises a current monitor to monitor the current through the AC ultraviolet lamp and to provide a signal indicative of a state of current flow through the AC ultraviolet lamp.

3. The control system as in claim 2, wherein the controller is coupled to the current monitor to receive the signal indicative of the state of the current flow, and to interrupt power supplied by the AC utility power source to the AC ultraviolet lamp when the signal indicates an erratic state of current flow through the AC ultraviolet lamp resulting from the voltage being less than the voltage threshold.

4. The control system as in claim 2, wherein the monitor circuit comprises an electronic current meter coupled to monitor the current through the AC ultraviolet lamp, and to generate the signal indicative of the state of current flow through the AC ultraviolet lamp in response thereto.

5. The control system as in claim 2, further comprising a ballast coupled between the AC ultraviolet lamp and the AC utility power source, wherein the current monitor is coupled to the ballast, and wherein the signal indicative of the state of current flow through the AC ultraviolet lamp corresponds to the state of current flow through the ballast.

6. The control system as in claim 1, wherein the power characteristic comprises a voltage, and wherein the monitor circuit comprises a voltage monitor to monitor the voltage provided by the AC utility power source and to provide a signal indicative of the voltage provided by the AC utility power source.

7. The control system as in claim 6, wherein the controller is coupled to the voltage monitor to receive the signal indicative of the voltage provided by the AC utility power source, and to interrupt power supplied by the AC utility power source when the signal indicates that the voltage is less than the voltage threshold.

8. The control system as in claim 6, wherein the voltage monitor comprises an electronic voltage meter coupled across the AC utility power source to monitor the voltage.

9. The control system as in claim 6, further comprising a ballast coupled between the AC ultraviolet lamp and the AC utility power source, wherein the voltage monitor comprises an electronic voltage meter coupled between a reference voltage and at least one of the ballast, the AC ultraviolet lamp, or a supply switch, and wherein the electronic voltage meter provides the signal indicative of the voltage at the ballast, the AC ultraviolet lamp, or the supply switch respectively.

10. The control system as in claim 6, wherein the voltage monitor comprises a bridge circuit and a capacitance at an output of the bridge circuit to store a representation of the voltage provided by the AC utility power source.

11. The control system as in claim 6, wherein the voltage monitor monitors a peak voltage of the AC utility power source to provide a signal indicative of the peak voltage provided by the AC utility power source.

12. The control system as in claim 6, wherein the voltage monitor monitors an RMS voltage of the AC utility power source to provide a signal indicative of the RMS voltage provided by the AC utility power source.

13. The control system as in claim 6, further comprising a ballast coupled between the AC ultraviolet lamp and the AC utility power source, wherein the voltage monitor is coupled to the ballast, and wherein the signal indicative of the voltage provided by the AC utility power source corresponds to the voltage provided to the ballast.

14. The control system as in claim 1, further comprising a controllable switch coupled between the AC utility power source and the AC ultraviolet lamp, wherein the controller interrupts power supplied by the AC utility power source to the AC ultraviolet lamp by automatically opening the controllable switch in response to the signal indicating that the voltage of the AC utility power source is less than the voltage threshold.

15. The control system as in claim 14, further comprising a user interface coupled to the controllable switch to facilitate initial closing of the controllable switch to provide the power from the AC utility power source to the AC ultraviolet lamp.

16. The control system as in claim 15, further comprising a start timer for initiating a predetermined switch delay in response to the initial closing of the controllable switch, wherein the start timer prohibits the automatic opening of the controllable switch in response to the signal indicating that the voltage of the AC utility power source is less than the voltage threshold until expiration of the predetermined switch delay.

17. The control system as in claim 1, further comprising a ballast coupled between the AC ultraviolet lamp and the AC utility power source, wherein the ballast comprises a power enable input coupled to a ballast switch, and wherein the controller interrupts power supplied by the AC utility power source to the AC ultraviolet lamp by providing a power disable signal to the power enable input in response to the signal indicating that the voltage of the AC utility power source is less than the voltage threshold to cause the ballast switch to open.

18. The control system as in claim 1, wherein the AC ultraviolet lamp comprises a power enable input coupled to a lamp switch, and wherein the controller interrupts power supplied by the AC utility power source to the AC ultraviolet lamp by providing a power disable signal to the power enable input in response to the signal indicating that the voltage of the AC utility power source is less than the voltage threshold to cause the lamp switch to open.

19. The control system as in claim 1, wherein the at least one AC ultraviolet lamp comprises a fluorescent lamp.

20. The control system as in claim 1, wherein the controller is configured to restore power supplied by the AC utility power source to the AC ultraviolet lamp in response to at least one predetermined event.

21. The control system as in claim 20, wherein the at least one predetermined event comprises at least one of an expiration of a predetermined time duration, an expiration of a predetermined count value, a time of day, and a signal indicating acceptable source voltage levels.

22. An ultraviolet (UV) air treatment system for treating air provided by an air handling system having an air duct arrangement for channeling the air through a targeted space, the UV air treatment system comprising:
   at least one UV lamp positionable within the air duct arrangement;
   a controllable switch coupled between a power source and the UV lamp to enable power to the UV lamp when the controllable switch is closed and to disable power to the UV lamp when the controllable switch is open;
   a monitor circuit coupled to monitor at least one power characteristic of the power source when the controllable switch is closed, and to provide a signal indicative of the power characteristics in response thereto; and
   a controller coupled to the monitor circuit to receive the signal, and to open the controllable switch when the signal indicates that a voltage of the power source is less than a voltage threshold.

23. The UV air treatment system as in claim 22, wherein the power characteristic comprises a current, and wherein the monitor circuit comprises a current monitor to monitor the current through the UV lamp and to provide a signal indicative of a state of current flow through the UV lamp.

24. The UV air treatment system as in claim 23, wherein the controller is coupled to the current monitor to receive the signal indicative of the state of the current flow, and to interrupt power supplied by the power source to the UV lamp when the signal indicates an erratic state of current flow through the UV lamp resulting from the voltage being less than the voltage threshold.

25. The UV air treatment system as in claim 23, further comprising a ballast coupled between the UV lamp and the power source, wherein the current monitor is coupled to the ballast, and wherein the signal indicative of the state of current flow through the UV lamp corresponds to the state of current flow through the ballast.

26. The UV air treatment system as in claim 22, wherein the power characteristic comprises a voltage, and wherein the monitor circuit comprises a voltage monitor to monitor the voltage provided by the power source and to provide a signal indicative of the voltage provided by the power source.

27. The UV air treatment system as in claim 26, wherein the controller is coupled to the voltage monitor to receive the signal indicative of the voltage provided by the power source, and to interrupt power supplied by the power source when the signal indicates that the voltage is less than the voltage threshold.

28. The UV air treatment system as in claim 26, further comprising a ballast coupled between the lamp and the power source, wherein the voltage monitor is coupled to the ballast, and wherein the signal indicative of the voltage provided by the power source corresponds to the voltage provided to the ballast.

29. The UV air treatment system as in claim 22, wherein the controllable switch comprises a switch circuit coupled between the power source and the UV lamp to enable power to the UV lamp when the switch circuit is closed and to disable power to the UV lamp when the switch circuit is open, and wherein the controller opens the switch circuit in response to the signal indicating that a voltage of the power source is less than a voltage threshold.

30. The UV air treatment system as in claim 22, further comprising a ballast coupled between the UV lamp and the power source and having a power enable input coupled to a ballast switch operating as the controllable switch, wherein the controller provides a power disable signal to the power enable input of the ballast in response to the signal indicating that the voltage of the source is less than the voltage threshold to cause the ballast switch to close.

31. The UV air treatment system as in claim 22, wherein the air duct arrangement comprises at least a supply air duct and a return air duct, and wherein the at least one UV lamp is positionable within the supply air duct.

32. A method for increasing lamp longevity in an air treatment system, comprising:
   operating at least one ultraviolet lamp in an air duct arrangement of the air treatment system to treat at least some of the air flowing through the air duct arrangement;
   monitoring an AC power characteristic of a power source supplying power to the ultraviolet lamp;
   generating a signal representative of a voltage level of the power source based on the monitored AC power characteristic; and
   controlling connection of the power to the ultraviolet lamp based on the generated signal.

33. The method of claim 32, wherein monitoring an AC power characteristic of a power source comprises monitoring an AC voltage of the power source supplying power to the ultraviolet lamp, and wherein generating a signal representative of the voltage level of the power source comprises generating a signal identifying the voltage level of the power source.

34. The method of claim 32, wherein monitoring an AC power characteristic of a power source comprises monitoring an AC current of the power source supplying power to the ultraviolet lamp, and wherein generating a signal representative of the voltage level of the power source comprises generating a signal corresponding to a current flowing through the ultraviolet lamp which is dependent on the voltage level of the power source.

35. The method of claim 32, wherein controlling connection of the power to the ultraviolet lamp comprises controlling a switch coupled in a circuit path including at least the power source and the ultraviolet lamp, based on the generated signal representative of the voltage level of the power source.

36. The method of claim 35, wherein controlling the switch comprises opening the circuit path via the switch when the generated signal indicates that the AC power characteristic is not sufficient to maintain an uninterrupted current flow through the ultraviolet lamp.

37. The method of claim 36, wherein controlling the switch comprises closing the circuit path via the switch in response to at least one predetermined event.

38. The method of claim 32, wherein controlling connection of the power to the ultraviolet lamp comprises performing at least one power interrupt cycle, comprising:
   removing power provided by the power source to the ultraviolet lamp using at least one switch circuit, when the generated signal indicates that the AC power characteristic is insufficient to maintain a stable current flow through the ultraviolet lamp; and
   restoring power provided by the power source to the ultraviolet lamp using the at least one switch circuit in response to at least one predetermined event, wherein the at least one predetermined event comprises any one or more of expiration of a predetermined time duration, expiration of a predetermined count value, occurrence of a predetermined time of day, and occurrence of an indication that the AC power characteristic is sufficient to maintain a stable current flow through the ultraviolet lamp.

39. The method of claim 38, further comprising:
   tracking a number of the power interrupt cycles occurring;
   comparing a current number of power interrupt cycles to a predetermined power interrupt cycle value; and
   changing to a different operation state in response to the current number of power interrupt cycles reaching the predetermined power interrupt cycle value.

40. The method of claim 39, wherein at least one of the operation states includes a termination state where power interrupt cycles are terminated.

41. The method of claim 32, wherein controlling connection of the power to the ultraviolet lamp comprises controlling a switch internal to a ballast, based on the generated signal representative of the voltage level of the power source.

42. The method of claim 32, further comprising positioning the at least one ultraviolet lamp in the air duct arrangement of the air treatment system, wherein the at least one ultraviolet lamp is used as a germicide in the air treatment system.

* * * * *